Dec. 3, 1968    W. LARSON    3,413,875
COOLANT APPLICATOR FOR DRILL MOTORS
Filed July 28, 1966    2 Sheets-Sheet 1
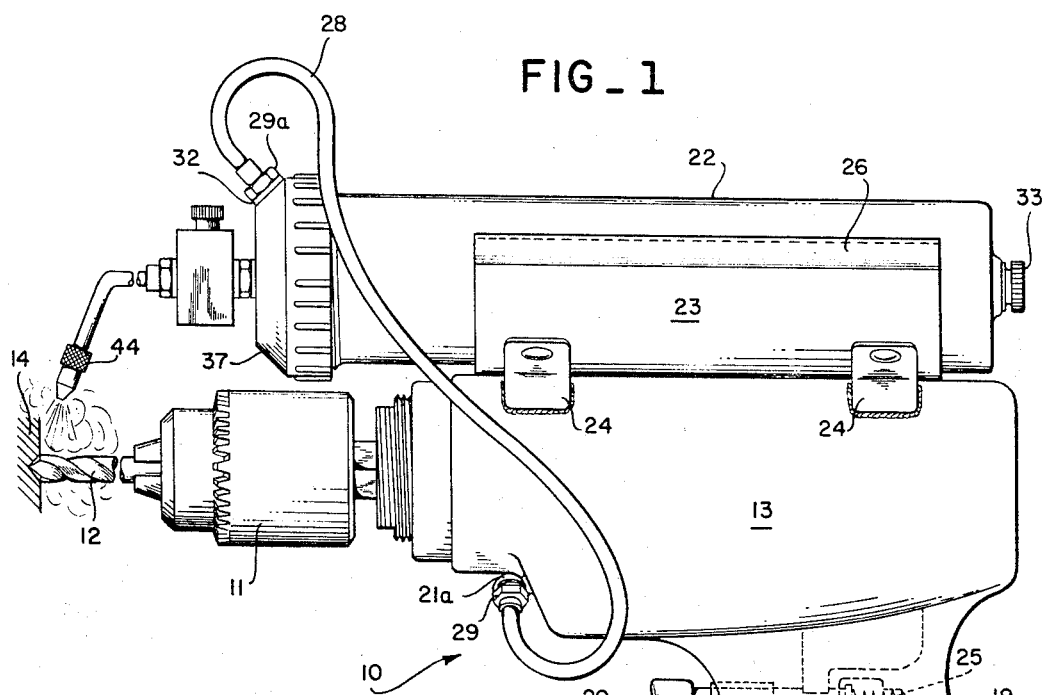
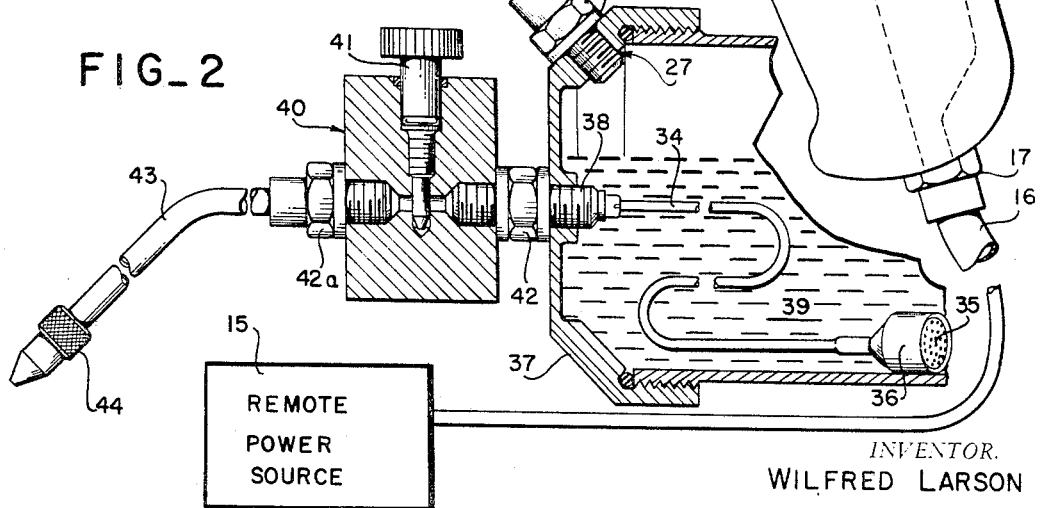
INVENTOR.
WILFRED LARSON
BY George C. Sullivan
Agent Dec. 3, 1968  W. LARSON  3,413,875
COOLANT APPLICATOR FOR DRILL MOTORS
Filed July 28, 1966  2 Sheets-Sheet 2
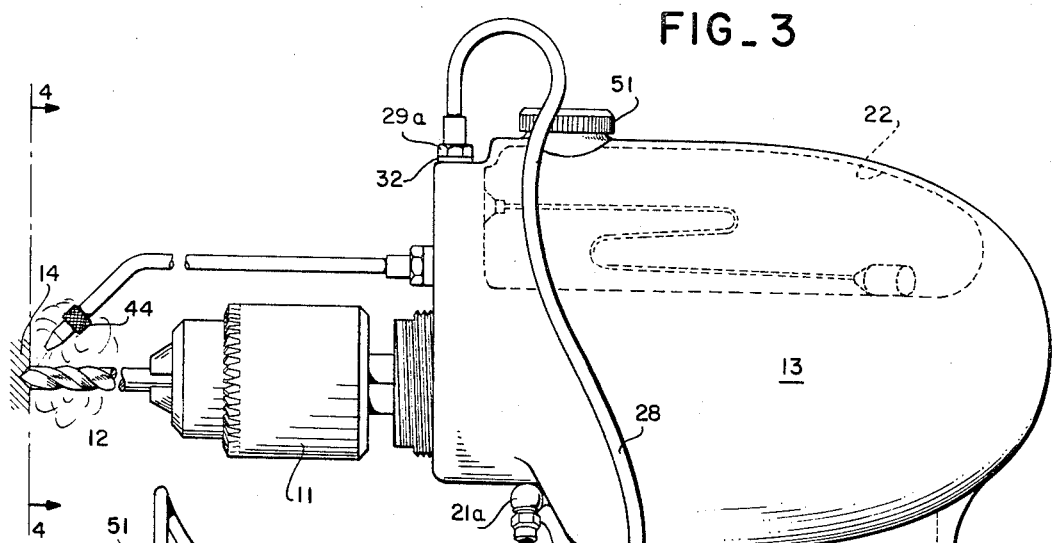
FIG_3
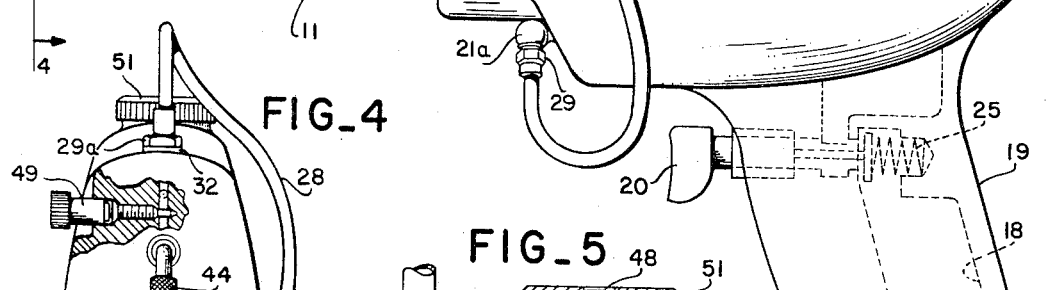
FIG_4  FIG_5
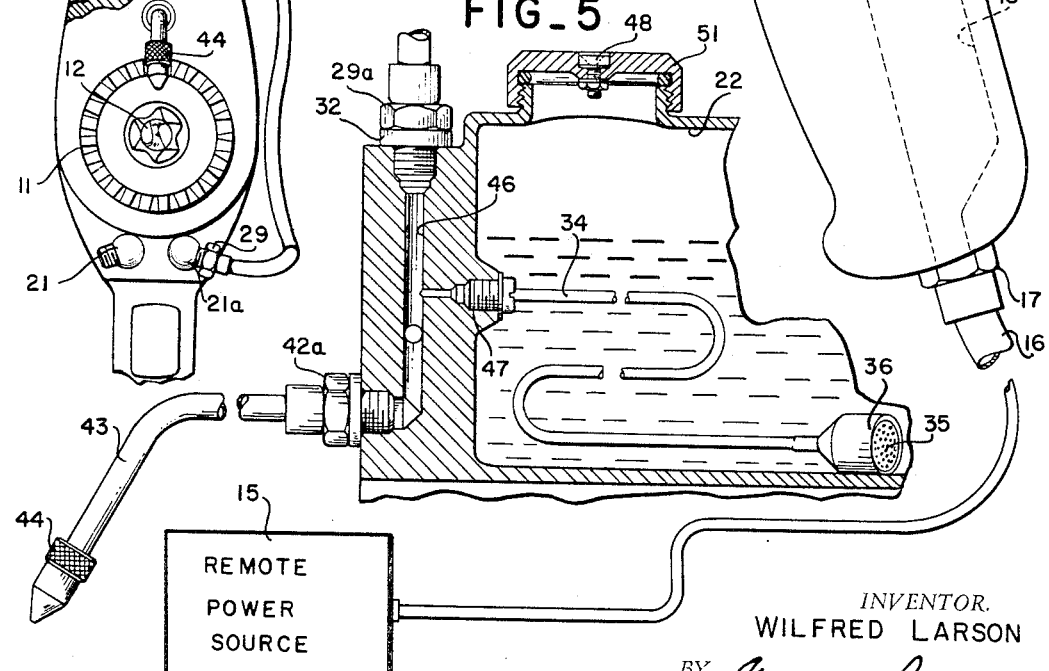
REMOTE POWER SOURCE
*INVENTOR.*
WILFRED LARSON
BY George C. Sullivan
Agent United States Patent Office 3,413,875
Patented Dec. 3, 1968

3,413,875
COOLANT APPLICATOR FOR DRILL MOTORS
Wilfred Larson, Van Nuys, Calif., assignor to Lockheed Aircraft Corporation, Burbank, Calif.
Filed July 28, 1966, Ser. No. 568,662
9 Claims. (Cl. 77—7)

ABSTRACT OF THE DISCLOSURE

A power driven tool for drilling and the like includes a coolant container, suitably pressurized, with flexibly retained means in the container for coolant pickup. A conduit leading from the pickup terminates in a spray nozzle for directing coolant onto a cutting member.

The present invention relates to power-driven cutting tools, such as drills, and more particularly to an apparatus for cooling the cutting portion of such tools.

It is well known that the machineability of a metal is the measure of the ease with which it can be cut. This characteristic is extremely complex but is of great importance. The effect of machineability may best be illustrated by several examples. Cast iron, for instance, is definitely harder than copper, but is easier to machine because of its brittle nature as contrasted with the more ductible copper. Again, some of the plastics are much softer than most metals but are more difficult to machine because the abrasive nature of the material results in excessive tool wear.

In order to appreciate the nature of the difficulties involved in working with titanium, it is necessary for the user to be aware of its metallurgy, properties and alloying behavior. Here major factors include the chemical activity of titanium at elevated temperatures and the pronounced influence on its properties by small amounts of impurities, particularly oxygen, nitrogen and hydrogen. Oxygen and nitrogen dissolve in titanium interstitially and cause a rapid increase in strength and hardness with a corresponding loss of ductility. Because of these characteristics, large, powerful and robust machine tools are presently being used to cut titanium with sharp cutting bits, slow speeds and heavy feeds. While many producers prefer to carry out such operations as turning and planing without coolants, they are considered necessary in sawing, milling and drilling.

With the advent of newer types of titanium and the still more exotic materials, a considerable problem has arisen regarding the useful life of cutting tools and the decrease in the ease with which holes may be drilled. Overheating of the drilled area and the inability to obtain a drilled hole of high quality, has to date presented very serious problems. In addition, as the cost of the more exotic materials is comparatively high, any mistake or accident in their machining can be extremely expensive. It has therefore become common practice to replace the twist drills with new or newly machined ones after very short use periods.

In order to alleviate these problems and maximize the economy of machining and drilling exotic metals, four dependant factors are generally considered to be of utmost importance. First, the proper geometry of the drill itself is extremely necessary to insure a maximum efficiency in drilling or machining the metal. Second, the revolutions per minute (r.p.m.) of the motor which is powering the tool must be correct for the type of material being worked upon and the type of tool being used. Third, the operator when dealing with these exotic metals must maintain the proper feed or pressure, and fourth, coolant should be applied to cut down heat, thereby allowing the tool r.p.m. to be increased.

When working with large pieces of hard material, it is not uncommon to wear out several drills while drilling a single hole. The quality of such holes necessarily suffers when the cutting edge of the drill overheats and becomes dull. The drill must then be removed and replaced with a new one. In order to temporarily overcome these heating and wearing conditions the drill operator sometimes reduces the tool r.p.m. and/or the feed pressure. Such reductions, however, will many times decrease the quality of the hole being drilled since the motor r.p.m. will be mismatched to the type of material being worked upon. When a coolant is used, the r.p.m. of the tool can be increased many times as can the resulting life of the drill. It is therefore the principal object of the present invention to increase the wear life of drills and tools, while concurrently permitting increased speed capabilities.

Another object of this invention is to facilitate greater tool speed when machining materials, thereby decreasing the amount of operator time required to complete a given job.

A further object of this invention is to provide a method of increasing the quality of work being done by power tool operators.

To these and other ends, the inventive device resides in certain improvements and combinations of parts hereinafter more fully described, the novel features being pointed out in the claims at the end of the specifications.

In the drawings:

FIGURE 1 is an elevational view of a first embodiment of the invention employed with a power driven drill;

FIGURE 2 is an enlarged partial sectional elevation of the coolant applicator portion of the apparatus of FIGURE 1;

FIGURE 3 is an elevational view of an alternate embodiment of the invention partially cut away to better illustrate the device, and wherein the coolant storage tank is integral with the drill housing;

FIGURE 4 is a fragmentary front elevation view of the apparatus of FIGURE 3, partially cut away to show the container and valving configurations; and FIGURE 5 is a sectional enlargement of a portion of the apparatus of FIGURE 3, further illustrating the container and valving configuration.

While the invention herein relates to the art of spray cooling cutting tools and metals and finds many applications, it is particularly applicable to the art of drilling, especially the drilling of hard metals and deep holes with portable power-driven hand tools. By way of example only, the invention is illustrated in its application to a drill.

FIGURES 1 and 2 show a portable power-driven hand tool 10 having a spindle portion 11 and a removably mounted drill bit 12, conventionally disposed within the sprindle portion 11.

The spindle 11 is adapted to be rotated, in the illustrated embodiment, by a suitable pneumatic driving mechanism (not shown) contained within a housing 13 and is formed by the operator into the material 14 upon which work is to be performed. The pneumatic driving mechanism receives its pneumatic pressure from a remote pressure source 15 through a hose 16 and an inlet port 17 communicating with a suitable conduit 18 in a handle 19 of the tool. Actuation of the pneumatic driving mechanism 13 is accomplished by a trigger-actuated switch 20 which selectively opens and closes the conduit 18 leading from the inlet port 17 to the driving mechanism responsive to operator action. The trigger actuated switch is normally held in the closed position by biasing means such as the spring 25 illustrated in FIGURES 1 and 3. As the tool operator urges the trigger switch in opposition to the spring 25, pressurized fluid is allowed to pass into the housing 13 thereby actuating the pneumatic driving mechanism for rotating the drill bit 12. The pneumatic pressure which actuates the pneumatic driving mechanism 13 is thereafter expelled from the power driven tool 10 through outlet ports 21 and 21a. While it is generally desirable to spray coolant only when the tool is actually operating it may, under some circumstances, be necessary to have continuous and/or independent spray. Under these circumstances, a portion of the hose 16 may be channeled directly to the coolant container 22 thereby by-passing the switch 20 or, in the alternative, another hose may be utilized to connect the container separately to the remote pressure source 15.

The power-driven tool 10 supports the coolant container 22 by any suitable means. In the present instance such support is accomplished by use of a cradle 23 and connecting brackets 24. The cradle 23 is adapted so as to receive the coolant container 22 within its retaining edges 26 which bear against the coolant container 22 and thereby restrict its movement after it has been disposed therein. The interior contour of the cradle is selectively shaped so as to match the external contour of the container. The cradle retaining edges extend beyond the center-line of the container and are biased to accomplish a gripping action on the container sides.

The cradle 23 is secured to the power driven tool 10 by means of the connecting brackets 24, which are themselves attached to the tool 10 and to the cradle 23 by welding, soldering, bolting, or the like.

The coolant container 22 has a cap 37 threadedly engaged upon its forward end. The cap 37 includes an inlet connector port 27 disposed therethrough. Fluid expelled from the outlet port 21a of the power driven tool 10 is channeled through a flexible conduit 28 which is attached to the housing outlet port 21a and to the coolant container inlet port 27 by means of threaded fittings 29 and 29a, respectively.

Each of the connectors 29 and 29a provides for a fluid-tight attachment to its respective port. If desired, a seal 32, preferably of elastomeric material, may be conventionally positioned so as to bear against the inlet connector port 27 and the outlet port 21a as the threaded connectors are tightened.

When the pressurizing medium is forced from the outlet port 21a and through the flexible conduit 28 into the coolant container 22, the increased pressure within the coolant container 22 forces the coolant through the conduit 34.

The conduit 34 is preferably constructed of a flexible material to permit its placement at, or movement into, any position within, or angle relative to, the coolant container 22. Since the coolant level changes due to gravity as the coolant container 22 is rotated, a compensating weight fluid pickup 36 is attached to the conduit 34. The weighted fluid pickup 36 assures that the opening to the conduit 34 is always near the "bottom" of the coolant, since the forces acting on the coolant and causing it to move will have a similar effect upon the weighted fluid pickup. While the weighted fluid pickup 36 is shown in the preferred embodiment, it is to be understood that a weighted element attached substantially near the inlet opening to the conduit 34 may be utilized so long as it does not obstruct fluid flow through the conduit.

An aperatured disc 35 of the weighted fluid pickup 36 additionally acts to filter out any contaminating particles from the coolant 39 as it passes into the conduit 34.

The conduit 34 is of sufficient length that in no matter what position the tool is used the fluid pick-up will be in contact with the coolant 39.

The conduit opening opposite the weighted fluid pick-up is connected to an output port 38 for channeling the coolant to the output conduit 43. A connecting valve housing 40, having a channel disposed therethrough, is connected between the output port 38 and output conduit 43 by connector conduits 42 and 42a, respectively.

A manually adjustable needle valve 41 disposed within the housing 40 is positioned so as to interrupt the coolant 39 which flows from the output port 38. The purpose of the valve 41 is to increase or decrease the amount of coolant 39 traversing and exiting from the various conduits. If desired, an alternate valving configuration, such as that shown in FIGURE 4 may be used. Here the valve 49 is mounted in the coolant container itself and interrupts the pressurized fluid instead of the coolant flow. By regulating the desired amount of pressurized fluid permitted to flow through the tool housing passage 46, the aspirator effect across the outlet port of the conduit connector 47 can be selectively controlled. If necessary, the valve 41 or 49 can be closed, thereby shutting off the flow of coolant and permitting uncooled drilling operations. Also, when a deep hole must be drilled in a thick piece of material, it may not be desirable to spray coolant until the drill bit is withdrawn to clean bits of material from the hole.

The outlet conduit 43 is attached to the connector conduit 42a so as to receive coolant forced therethrough. The outlet conduit may be fixedly or adjustably mounted to the conduit 42a, or may be fabricated from a deformable substance such as a plastic, an elastomer, or the like, to allow for adjustment in the area desired to be sprayed.

A nozzle 44 of conventional structure is attached to the outlet conduit 43 to permit an additional adjustment in the area to be sprayed, and in the density of the spray.

The amount of spray desired, and the area to be covered, are functionally dependent not only upon the type of coolant used, but upon the particular job desired to be accomplished. It has been found generally more desirable to use a fast-drying coolant such as a Freon or oxylene rather than some of the slower-drying cooling agents so as to prevent the coolant from running. In this manner the operator can observe his work continuously and need not be concerned with coolant dripping onto the other parts with which it may chemically react.

In the modified embodiment of FIGURE 3, 4, and 5, a tool having an integrally mounted coolant container 22 is illustrated. While the integrally mounted coolant container eliminates the necessity for a cradle and connecting brackets, such a container cannot be removed nor replaced by a larger one. Thus, while there are distinct advantages to both types, the selection should depend upon individual requirements.

Referring to FIGURE 3, as the pressurized fluid passes from the outlet port 21a, it is channeled by the conduit 28 to the connector conduit 29a. The connector conduit 29a, which is attached to the power-driven tool 10, is positioned so as to guide the pressurized fluid into the tool housing passage 46. Fluid in the tool housing passage 46 flows past the opening of the connector conduit 47, which leads to the coolant 39 by means of the conduit 34. As a result of the pressure drop across the opening to the connector conduit 47, caused by the fluid flow, the coolant 39 within the coolant container 22 is forced through the conduit 34 and into the tool housing passage 46.

As previously described, the manually adjustable valve 49 is connected to the power-driven tool 10 and is positioned so as to selectively interrupt the flow of pressurized fluid through the tool housing passage 46. When in the open position, the valve 49 will allow the coolant 39 and pressurized fluid mixture to pass through the conduit 43 and onto the drill bit 12 or material 14.

A cap 51 threadably engages the coolant container and permits re-filling and cleaning of the coolant container 22. A relief port 48 is provided in the cap 51 of the coolant container 22 so as to prevent the pressure differential from equalizing to the point where it overcomes the "aspirator" effect which causes the fluid to pass through the conduit connector 47.

Although the invention is illustrated with a pneumatically actuated tool, the coolant sprayer is equally adaptable to an electrically-driven tool with a separate pneumatic power source for the applicator. Thus, while the present invention has been shown in certain embodiments, it is to be understood that various modifications may be made by those skilled in the art without departing from the invention herein disclosed. Therefore, this application is to be limited only by the scope of the appended claims.

I claim:
1. A coolant dispensing power tool comprising:
   power tool means having cutter means which is to be cooled;
   a coolant container operably connected to said tool and having an inlet port and an outlet port;
   coolant pickup means within said container flexibly connected to said outlet port for receiving coolant regardless of coolant container orientation;
   coolant dispensing means in fluid communication with said outlet port and adapted to direct the flow of said coolant towards said cutter means; and
   a source of fluid pressure connected to said inlet port for pressurizing said coolant container and thereby forcing said coolant out said outlet port and through said dispensing means.
2. A coolant dispensing power tool as defined in claim 1, including an actuating means connected to said pressure source adapted to selectively cause said coolant container to be pressurized.
3. A coolant dispensing power tool comprising:
   a housing;
   power tool means having a cutter means which is to be cooled exteriorly of said housing;
   a coolant container located interiorly of said housing and having inlet and outlet ports;
   a conduit located upon said power tool means, said conduit means being in coolant receiving relationship with said outlet port;
   coolant dispensing means connected to said conduit for directing the flow of said coolant into a predetermined position relative to said cutter means; and
   a source of fluid pressure connected to said inlet port so as to cause a pressure drop across said outlet port and thereby urge said coolant to be dispensed through said outlet port and said dispensing means.
4. A coolant dispensing power tool as defined in claim 3, including a weight connected to said conduit, said weight having apertures therethrough in coolant communicating relationship with said opening, said weight being adapted to assume coolant pickup irrespective of tool orientation by movement of said weight into the lower portion of said coolant container when said container is moved.
5. A coolant dispensing power tool as defined in claim 1 wherein said dispensing means comprises:
   valve means connected to said outlet port for regulating said coolant to be dispensed; and
   conduit means connected to said valve means, said conduit means being in fluid-receiving relationship with said valve means and having a nozzle at one end thereof for directing coolant flow.
6. A coolant dispensing power tool as defined in claim 1 wherein said source of fluid pressure simultaneously operates said tool.

7. A coolant dispensing power tool comprising:
   power tool means having a cutter means which is to be cooled;
   a coolant container operably connected to said tool and having an inlet and an outlet port;
   coolant dispensing means in fluid communication with said outlet port and adapted to direct the flow of said coolant generally towards said cutter means, said dispensing means comprising:
      valve means connected to said outlet port for regulating the coolant to be dispensed; and
      conduit means connected to said valve means, said conduit means being in fluid receiving relationship with said valve means and having a nozzle at one end thereof for directing coolant flow;
   a flexible conduit connected to said outlet port and having an opening in coolant-receiving relationship within said coolant container;
   a weight connected to said conduit, said weight having apertures therethrough in coolant-receiving relationship with said opening.
8. A coolant dispensing power tool comprising:
   a housing;
   power tool means having cutter means which is to be cooled exteriorly of said housing;
   a coolant container means in said housing defining interiorly of said housing and having inlet and outlet ports;
   a flexible conduit connected to said outlet port and having an opening in coolant-receiving relationship within said coolant container;
   a weight connected to said flexible conduit, said weight having apertures therethrough in coolant-communicating relationship with said opening;
   a second conduit located upon said power tool means, said second conduit being in coolant-receiving relationship with said outlet and with said flexible conduit;
   coolant dispensing means connected to said second conduit for directing the flow of said coolant towards said area, said dispensing means comprising:
      valve means connected to said outlet port for regulating said coolant to be dispensed; and
      third conduit means connected to said valve means, said third conduit means being in fluid-receiving relationship with said valve means and having a nozzle at one end thereof for directing coolant flow; and
   a source of fluid pressure connected to said inlet port so as to cause a pressure drop across said outlet port and thereby urge said coolant to be dispensed through said outlet port and said dispensing means.
9. A coolant dispensing power tool as defined in claim 8, including a trigger actuating means connected to said pressure source for selectively causing said pressure drop across said outlet port.

References Cited

UNITED STATES PATENTS 2,581,943   1/1952   Dautrebande _____ 175—212

FRANCIS S. HUSAR, *Primary Examiner.*